United States Patent
Kang

(10) Patent No.: US 10,684,164 B2
(45) Date of Patent: Jun. 16, 2020

(54) DISPLAY BRIGHTNESS CONTROL METHOD, ELECTRONIC DEVICE, AND COMPUTER-READABLE RECORDING MEDIUM

(71) Applicant: Samsung Electronics Co., Ltd., Gyeonggi-do (KR)

(72) Inventor: Seung-goo Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/080,885

(22) PCT Filed: Feb. 7, 2017

(86) PCT No.: PCT/KR2017/001320
§ 371 (c)(1),
(2) Date: Aug. 29, 2018

(87) PCT Pub. No.: WO2017/150815
PCT Pub. Date: Sep. 8, 2017

(65) Prior Publication Data
US 2019/0041259 A1  Feb. 7, 2019

(30) Foreign Application Priority Data
Mar. 2, 2016 (KR) .................. 10-2016-0025036

(51) Int. Cl.
*G09G 3/32* (2016.01)
*G09G 3/36* (2006.01)
(Continued)

(52) U.S. Cl.
CPC .............. *G01J 1/0271* (2013.01); *G01J 1/32* (2013.01); *G01J 1/4204* (2013.01);
(Continued)

(58) Field of Classification Search
CPC ................ G02F 1/133; G02F 1/1333; G02F 2001/13312; G06F 1/1626; G06F 1/1643;
(Continued)

(56) References Cited

U.S. PATENT DOCUMENTS 7,586,479 B2 * 9/2009 Park ...................... G06F 3/0421
178/18.01
8,031,167 B2 * 10/2011 Lee ....................... G09G 3/3406
345/102
(Continued)

FOREIGN PATENT DOCUMENTS

| JP | 2003-208128 | 7/2003 |
| JP | 2007-279179 | 10/2007 |

(Continued)

OTHER PUBLICATIONS

European Search Report dated May 13, 2019 issued in counterpart application No. 17760219.0, 12 pages.
(Continued)

*Primary Examiner* — Michael J Eurice
(74) *Attorney, Agent, or Firm* — The Farrell Law Firm, P.C.

(57) ABSTRACT

Provided is an electronic device including a display; a first sensor located on a first surface of a housing including the display; a second sensor located on a second surface of the housing; and a processor for determining a state of the electronic device on the basis of at least a part of first sensing information acquired by the first sensor, acquiring second sensing information from the second sensor on the basis of the result of the determining the state of the electronic device, and determining the brightness of the display on the basis of at least one of the first sensing information and the second sensing information, wherein the second sensor includes a sensor for detecting light.

15 Claims, 13 Drawing Sheets

(51) Int. Cl.
*G09G 5/00* (2006.01)
*G09G 5/10* (2006.01)
*G01J 1/42* (2006.01)
*G01J 1/02* (2006.01)
*H04M 1/725* (2006.01)
*G06F 3/0346* (2013.01)
*G01J 1/32* (2006.01)
*G06F 3/041* (2006.01)
*G02F 1/133* (2006.01)
*G06F 1/16* (2006.01)
*G09G 3/20* (2006.01)
*H04M 1/22* (2006.01)
*H04N 21/422* (2011.01)

(52) U.S. Cl.
CPC .......... G01J 1/4228 (2013.01); G06F 3/0346 (2013.01); G06F 3/041 (2013.01); H04M 1/725 (2013.01); *G01J 1/42* (2013.01); *G02F 1/133* (2013.01); *G06F 1/1626* (2013.01); *G09G 3/20* (2013.01); *G09G 3/32* (2013.01); *G09G 3/36* (2013.01); *G09G 5/00* (2013.01); *G09G 5/10* (2013.01); *H04M 1/22* (2013.01); *H04N 21/42202* (2013.01)

(58) Field of Classification Search
CPC .... G06F 3/3225; G06F 3/3406; G06F 3/0346; G06F 3/041; G09G 3/20; G09G 3/2007; G09G 3/32; G09G 3/34; G09G 3/3406; G09G 3/36; G09G 5/00; G09G 5/10; G09G 2300/026; G09G 2320/0626; G09G 2360/144; G09G 2360/16; G01J 1/0271; G01J 1/32; G01J 1/42; G01J 1/4204; G01J 1/4228; H04M 1/22; H04M 1/0266; H04M 1/725; H04M 1/72569; H04M 2250/12; H04N 21/42202; Y02D 10/00; Y02D 10/153; Y02D 70/00
See application file for complete search history.

(56) References Cited

U.S. PATENT DOCUMENTS

| | | | | |
|---|---|---|---|---|
| 8,319,804 B2 | 11/2012 | Kuo | | |
| 8,405,686 B2 | 3/2013 | Tanizoe et al. | | |
| 2003/0161099 A1* | 8/2003 | Aoki | .................. | E05B 73/0082 361/679.29 |
| 2003/0222150 A1* | 12/2003 | Sato | .................... | G06F 1/1626 235/472.02 |
| 2004/0032382 A1* | 2/2004 | Cok | .................... | G09G 3/3216 345/82 |
| 2005/0087671 A1* | 4/2005 | Park | .................... | G09G 3/3406 250/205 |
| 2005/0275616 A1* | 12/2005 | Park | .................... | G06F 3/0421 345/102 |
| 2008/0165115 A1* | 7/2008 | Herz | .................... | G06F 1/3203 345/102 |
| 2008/0186294 A1* | 8/2008 | Lee | .................... | G09G 3/3406 345/207 |
| 2009/0295943 A1* | 12/2009 | Kim | .................... | H04N 5/217 348/231.99 |
| 2010/0201709 A1* | 8/2010 | Yang | .................... | H04N 21/44008 345/629 |
| 2010/0201716 A1* | 8/2010 | Tanizoe | .................. | G09G 3/2007 345/690 |
| 2011/0131358 A1* | 6/2011 | Ganesh | ................ | G01C 21/265 710/304 |
| 2011/0140961 A1* | 6/2011 | Yeh | .................... | H04M 1/04 342/357.42 |
| 2011/0181541 A1* | 7/2011 | Kuo | .................... | G06F 1/1637 345/174 |
| 2011/0187687 A1* | 8/2011 | Saitou | .................. | G02F 1/13318 345/207 |
| 2011/0222375 A1* | 9/2011 | Tsubata | .................... | G01J 1/02 368/11 |
| 2012/0069042 A1* | 3/2012 | Ogita | .................. | H04M 1/0264 345/589 |
| 2013/0207949 A1* | 8/2013 | Jiang | .................... | G09G 3/36 345/207 |
| 2013/0328842 A1* | 12/2013 | Barnhoefer | .......... | G09G 3/3406 345/207 |
| 2013/0342518 A1* | 12/2013 | Nakata | ................ | H04N 5/2351 345/207 |
| 2014/0132158 A1* | 5/2014 | Land | .................... | G09G 3/20 315/152 |
| 2014/0152632 A1* | 6/2014 | Shedletsky | .............. | G09G 5/10 345/207 |
| 2014/0183342 A1* | 7/2014 | Shedletsky | ........... | G06F 1/1637 250/215 |
| 2015/0061501 A1* | 3/2015 | Kim | .................... | G01J 1/4204 315/149 |
| 2015/0062104 A1* | 3/2015 | Choy | .................. | H04M 1/0283 345/207 |
| 2015/0070337 A1* | 3/2015 | Bell | .................... | G09G 3/2003 345/207 |
| 2015/0130823 A1* | 5/2015 | Kim | .................... | G09G 5/18 345/522 |
| 2015/0162945 A1* | 6/2015 | Karlsson | .............. | H02J 7/0044 455/557 |
| 2016/0179182 A1* | 6/2016 | Horie | .................... | G06F 1/1626 713/323 |
| 2017/0092228 A1* | 3/2017 | Cote | .................... | G09G 3/3225 |
| 2018/0373395 A1* | 12/2018 | Kim | .................... | G06F 3/0481 |
| 2018/0374408 A1* | 12/2018 | Ma | .................... | G09G 3/2003 |
| 2019/0114458 A1* | 4/2019 | Cho | .................... | G09G 3/20 |

FOREIGN PATENT DOCUMENTS

| | | |
|---|---|---|
| JP | 2010-091816 | 4/2010 |
| JP | 2011-160223 | 8/2011 |
| JP | 2013-205434 | 10/2013 |
| JP | 2014-064222 | 4/2014 |
| KR | 10-1088264 | 11/2011 |
| KR | 10-1249960 | 4/2013 |

OTHER PUBLICATIONS

International Search Report dated May 12, 2017 issued in counterpart application No. PCT/KR2017/001320, 21 pages.
European Search Report dated Jan. 3, 2019 issued in counterpart application No. 17760219.0-1020, 14 pages.

* cited by examiner

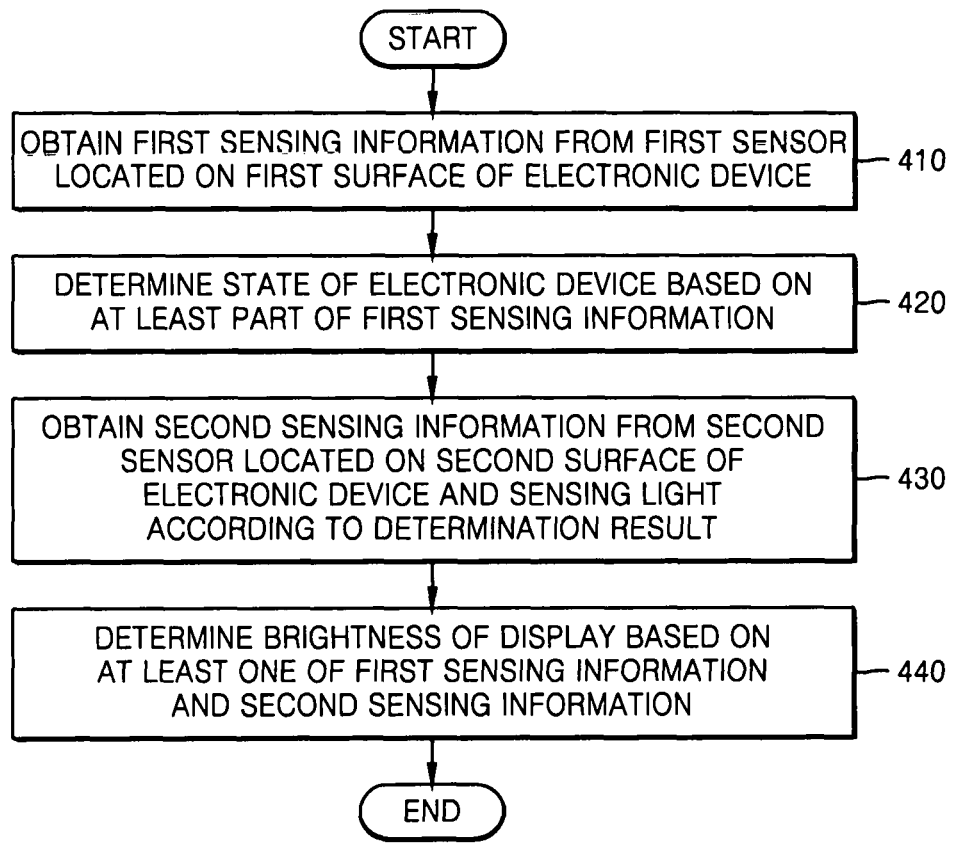
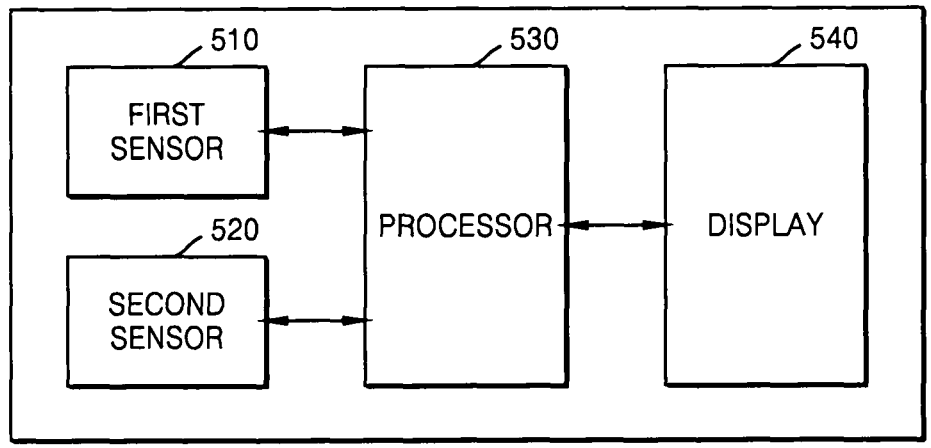

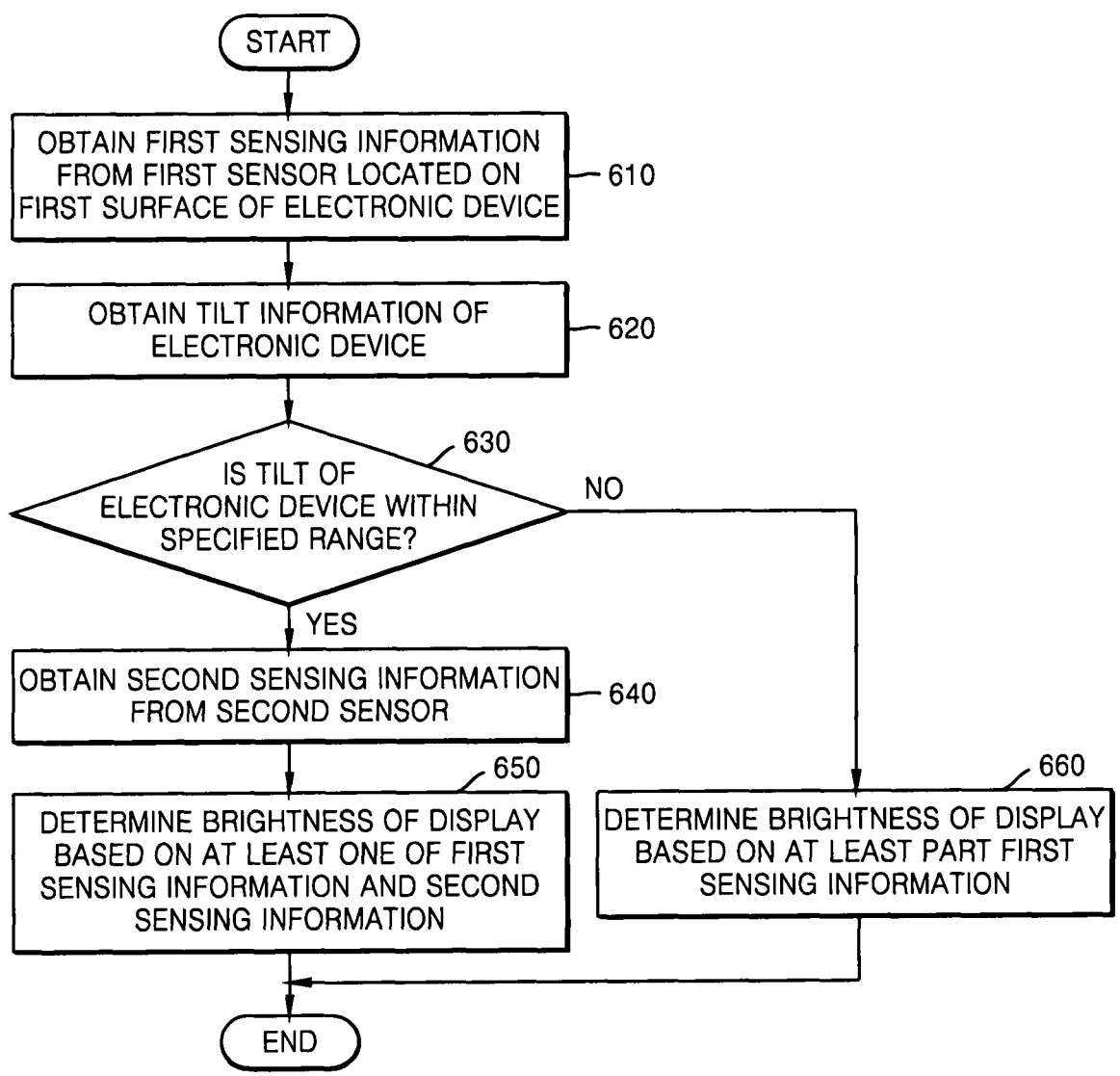

DISPLAY BRIGHTNESS CONTROL METHOD, ELECTRONIC DEVICE, AND COMPUTER-READABLE RECORDING MEDIUM

PRIORITY

This application is a National Phase Entry of PCT International Application No. PCT/KR2017/001320, which was filed on Feb. 7, 2017, and claims priority to Korean Patent Application No. 10-2016-0025036, which was filed on Mar. 2, 2016, the content of each of which are incorporated herein by reference.

TECHNICAL FIELD

The present disclosure relates to techniques for controlling the display brightness of an electronic device including a display.

BACKGROUND ART

An electronic device may measure the ambient illumination by using one illumination sensor located at the upper front part thereof and control the brightness of a display to correspond to a measured amount of light. When only an illumination sensor located on one side of a display electronic device is used, it may be difficult to control the brightness of the display because an appropriate amount of light according to a changed state of an electronic device is not measured.

DESCRIPTION OF EMBODIMENTS

Technical Problem

When measuring an amount of light using only a sensor located on one side of an electronic device, an appropriate amount of light may not be measured according to a state of the electronic device and thus, an appropriate brightness of a display may not be provided to a user.

Solution to Problem

According to an aspect of the present disclosure, an electronic device includes: a display; a first sensor located on a first surface of a housing including the display; a second sensor located on a second surface of the housing; and a processor for determining a state of the electronic device on the basis of at least a part of first sensing information acquired by the first sensor, acquiring second sensing information from the second sensor on the basis of the result of the determination, and determining the brightness of the display on the basis of at least one of the first sensing information and the second sensing information, wherein the second sensor includes a sensor for detecting light.

Advantageous Effects of Disclosure

According to an embodiment, the brightness of a display may be determined by using at least one of sensors provided in an electronic device according to a state of the electronic device, thereby providing a display having a more suitable brightness to a user.

BRIEF DESCRIPTION OF DRAWINGS

FIG. 4 is a flowchart illustrating a method performed by an electronic device to control the brightness of a display according to a state of the electronic device determined based on at least part of first sensing information according to various embodiments.

FIG. 5 is a block diagram of an electronic device according to another embodiment.

FIG. 6 is a flowchart illustrating a method performed by an electronic device to determine the brightness of a display using sensing information obtained from at least one of a first sensor and a second sensor according to a state of the electronic device according to various embodiments.

BEST MODE

Figure 1:
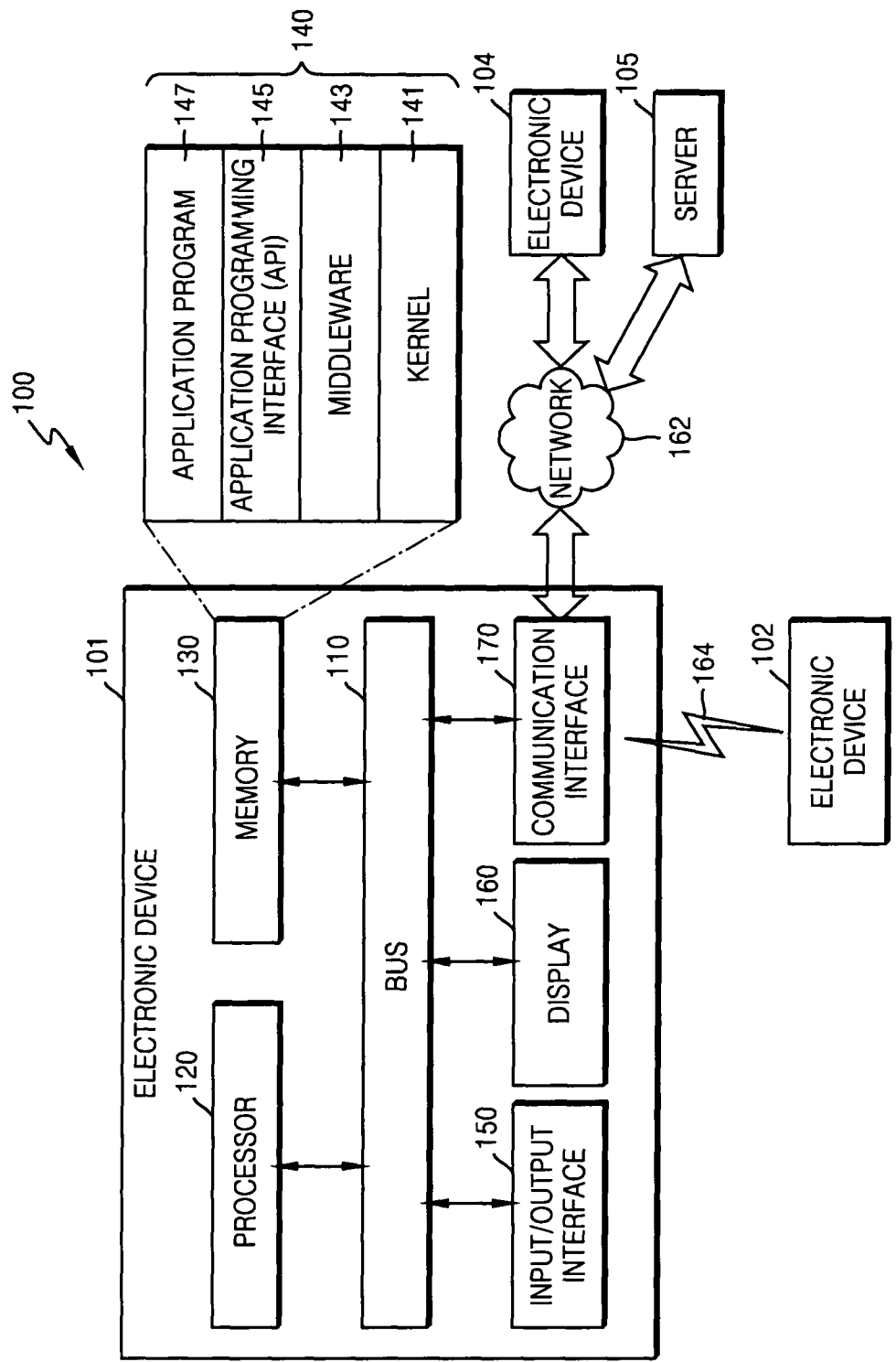
FIG. 1 is a schematic block diagram of an electronic device in a network environment according to various embodiments.

According to an aspect of the present disclosure, an electronic device includes: a display; a plurality of sensors located on a plurality of sides of a housing including the display; and a processor for determining a state of the electronic device on the basis of sensing information acquired by each of the plurality of sensors and determining the brightness of the display on the basis of at least one of the sensing information acquired according to the determined state of the electronic device.

According to another aspect of the present disclosure, a method performed by an electronic device to control brightness of a display includes obtaining first sensing information from a first sensor located on a first surface of the electronic device; determining a state of the electronic device based on at least part of the first sensing information; obtaining second sensing information from a second sensor located on a second surface of the electronic device and sensing light according to a result of the determining of the state of the electronic device; and determining brightness of a display based on at least one of the first sensing information and the second sensing information.

MODE OF DISCLOSURE

Hereinafter, the present disclosure will be described in detail with reference to the accompanying drawings. The present disclosure may have various embodiments, and modifications and changes may be made therein without departing from the scope and spirit of the present disclosure. Therefore, it should be understood that there is no intent to limit the present disclosure to the particular forms, and the present disclosure should be construed to cover all modifications, equivalents, and/or alternatives falling within the spirit and scope of the present disclosure. In describing the drawings, the same or similar elements are designated by similar reference numerals.

As used herein, the expressions "have", "may have", "include", and "may include" refer to the existence of a corresponding feature (e.g., numeral, function, operation, or constituent element such as component), and do not exclude one or more additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in embodiments of the present disclosure may modify various components regardless of the order and/or the importance but does not limit the corresponding components. For example, a first user device and a second user device indicate different user devices, although both of the devices are user devices. For example, a first element may be referred to as a second element, and similarly, a second element may be referred to as a first element without departing from the scope of the present disclosure.

When an element (e.g., a first element) is referred to as being (operatively or communicatively) "connected" or "coupled" to another element (e.g., a second element), this element may be directly connected or directly coupled to the other element or any other element (e.g., a third element) may be interposed between them. By contrast, when an element (e.g., a first element) is referred to as being "directly connected" or "directly coupled" to another element (e.g., a second element), there is no element (e.g., a third element) interposed between them.

The expression "configured to" as used herein may be used interchangeably with, for example, "suitable for", "having the capacity to", "designed to", "adapted to", "made to", or "capable of" according to the situation. The term "configured to" may not necessarily imply "specifically designed to" with respect to hardware. Alternatively, in some situations, the expression "device configured to" may mean that the device, together with other devices or components, "is able to". For example, the phrase "processor adapted (or configured) to perform A, B, and C" may refer to a dedicated processor (e.g., an embedded processor) used only to perform the corresponding operations or a generic-purpose processor (e.g., a central processor (CPU) or an application processor (AP)) that may perform the corresponding operations by executing one or more software programs stored in a memory device.

The terms used herein are merely used for the purpose of describing particular embodiments and do not limit the scope of other embodiments of the present disclosure. As used herein, singular forms of terms may include plural forms as well, unless the context clearly indicates otherwise. Unless defined otherwise, all terms used herein, including technical and scientific terms, have the same definitions as those commonly understood by a person of ordinary skill in the art to which the present disclosure pertains. Such terms as those defined in a generally used dictionary may be interpreted to have the same definitions as the contextual definitions in the relevant field of art, and are not to be interpreted to have ideal or excessively formal definitions, unless clearly defined in the present disclosure. In some cases, even terms defined in the present disclosure should not be interpreted in a manner that excludes embodiments of the present disclosure.

An electronic device according to various embodiments may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a wearable device, and a virtual reality (VR) device. According to various embodiments, the wearable device may include at least one of an accessory type device (e.g., a watch, a ring, a bracelet, a bracelet, a necklace, a spectacle, a contact lens or a head-mounted-device (HMD)), a texture or clothes integral type device (e.g., electronic apparel), a body attachment type device (e.g., a skin pad or tattoos), and a bio-implantable type device (e.g., an implantable circuit).

In some embodiments, the electronic device may be a home appliance. The home appliance may include at least one of, for example, a television, a digital video disk player, audio, a refrigerator, an air conditioner, a vacuum cleaner, an oven, a microwave, washing machine, an air cleaner, a set-top box, a home automation control panel, a security control panel, a TV box (e.g., Samsung HomeSync™, Apple TV™ or Google TV™), a game console (e.g., Xbox™ or PlayStation™), an electronic dictionary, an electronic key, a camcorder, and an electronic photo frame.

In another embodiment, the electronic device may include at least one of a variety of medical devices (e.g., various portable medical measurement devices such as a blood glucose meter, a heart rate meter, a blood pressure meter, or a body temperature meter), magnetic resonance angiography (MRA), magnetic resonance imaging (MRI), computed tomography (CT), a photographing device, a ultrasonic device, etc), a navigation system, a global navigation satellite system (GNSS), an event data recorder (EDR), a flight data recorder (FDR), an infotainment system, ship electronic equipment (e.g., a ship navigation system, a gyro compass, etc.), avionics, a security device, a vehicle head unit, an industrial or home robot, automatic teller's machine (ATM) of financial institutions, point of sales (POS) of shops, and an Internet of things device (e.g., a light bulb, various sensors, an electricity or gas meter, a sprinkler device, a fire alarm, a thermostat, a street light, a toaster, exercise equipment, a hot water tank, a heater, boiler, etc.)

According to some embodiments, the electronic device may include at least one of furniture or a part of a building/structure, an electronic board, an electronic signature receiving device, a projector, and various measuring instruments (e.g. water, electricity, gas, or radio wave measuring instrument, etc.) In various embodiments, the electronic device may be one of the various devices described above or a combination thereof. The electronic device according to some embodiments may be a flexible electronic device. Further, the electronic device according to an embodiment is not limited to the above-described devices, and may include a new electronic device according to technological advancement.

Hereinafter, an electronic device according to various embodiments will be described with reference to the accompanying drawings. In the present disclosure, the term "user" may indicate a person using a device or a device (e.g., an artificial intelligence electronic device) using the device.

FIG. 1 is a schematic block diagram of an electronic device 101 in a network environment according to various embodiments.

Referring to FIG. 1, according to various embodiments, the electronic device 101 operates in a network environment 100. The electronic device 101 may include a bus 110, a processor 120, a memory 130, an input/output interface 150, a display 160, and a communication interface 170. In some embodiments, the electronic device 101 may not include at least one of these components or may additionally include other components.

The bus 110 may include, for example, circuitry for connecting the components 110-170 to one another and for communicating communication (e.g., control messages and/or data) between the components 110-170.

The processor 120 may include one or more of a central processing unit (CPU), an application processor (AP), or a communication processor (CP). The processor 120 may perform computations or data processing related to, for example, control and/or communication of at least one other component of the electronic device 101.

The memory 130 may include volatile and/or non-volatile memory. The memory 130 may store, for example, instructions or data related to at least one other component of the electronic device 101. According to an embodiment, the memory 130 may store software and/or programs 140.

The program 140 may include, for example, a kernel 141, middleware 143, an application programming interface (API) 145, and/or an application program (or an application) 147. At least some of the kernel 141, the middleware 143, or the API 145 may be referred to as an operating system (OS).

The input/output interface 150 may serve as an interface by which, for example, instructions or data input from a user or another external device may be transmitted to another component(s) of the electronic device 101. The input/output interface 150 may output the instructions or data received from other component(s) of the electronic device 101 to the user or the other external device.

The display 160 may include, for example, a liquid crystal display (LCD), a light-emitting diode (LED) display, an organic light-emitting diode (OLED), a microelectromechanical systems (MEMS) display, or an electronic paper display. The display 160 may display, for example, various types of content (e.g., texts, images, videos, icons, or symbols, etc.) to the user. The display 160 may include a touch screen and may receive, for example, touch, gesture, proximity, or hovering input using an electronic pen or a part of a user's body.

The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

Wireless communication may use at last one of, for example, long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communications (GSM) as a cellular communication protocol. Wireless communication may also include, for example, near field communication 164. The near field communication 164 may include at least one of, for example, wireless fidelity (WiFi), Bluetooth, near field communication (NFC), and a global navigation satellite system (GNSS). The GNSS may include at least one of, for example, a Global Positioning System (GPS), a Global Navigation Satellite System (Glonass), a Beidou Navigation Satellite System (Beidou), and a Galileo, the European global satellite-based navigation system according to a use area or a bandwidth. Hereinafter, in the present disclosure, the GPS may be interchangeably used with the GNSS. Wired communication may include at least one of, for example, a universal serial bus (USB), a high definition multimedia interface (HDMI), a recommended standard 232 (RS-232), and plain old telephone service (POTS). The network 162 may include at least one of a telecommunications network, for example, a computer network (e.g., LAN or WAN), the Internet, or a telephone network.

Each of the first and second external electronic devices 102 and 104 may be the same as or different from the electronic device 101. According to an embodiment, the server 106 may include one or more groups of servers. According to various embodiments, all or a part of operations performed by the electronic device 101 may be performed by another electronic device or a plurality of electronic devices (e.g., the electronic device 102 and 104, or the server 106). According to an embodiment, when the electronic device 101 performs a function or service automatically or according to a request, the electronic device 101 may request another device (e.g., the electronic device 102 and 104, or the server 106) to perform at least some functions related to the function or service instead of performing the function or service or additionally. The other device (e.g., the electronic device 102 and 104, or the server 106) may perform requested or additional functions and transmit results thereof to the electronic device 101. The electronic device 101 may process the received results as they are or additionally and provide the requested functions or services. To this end, for example, cloud computing, distributed computing, or client-server computing techniques may be used.

Figure 2:
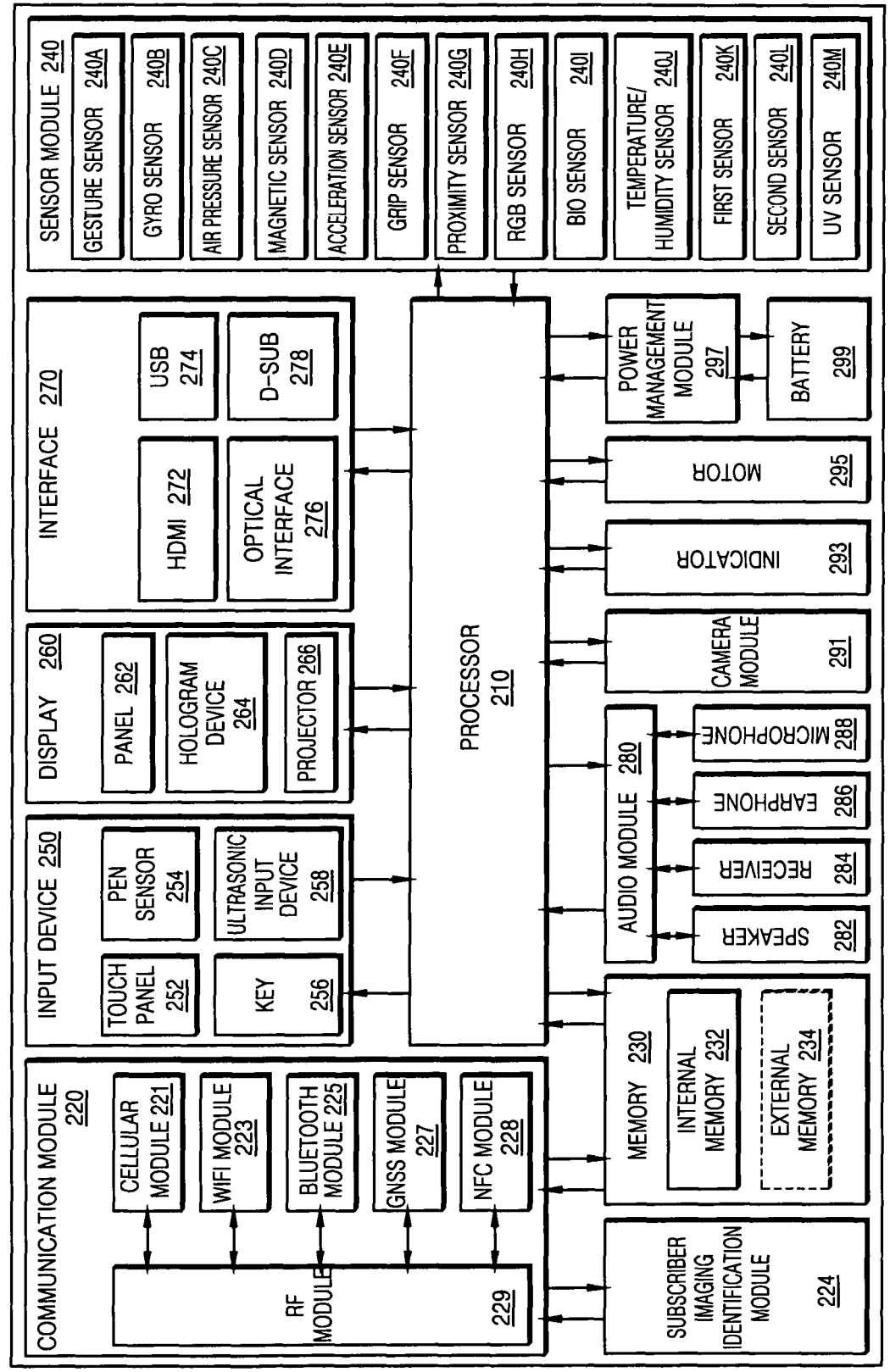
FIG. 2 is a schematic block diagram of an electronic device according to an embodiment.

FIG. 2 is a schematic block diagram of an electronic device 200 according to an embodiment.

The electronic device 200 according to an embodiment may include a processor 210, a communication module 220, a subscriber imaging identification module 224, a memory 230, a sensor module 240, an input device 250, a display 260, an interface 270, an audio module 280, a camera module 291, an indicator 293, a motor 295, a power management module 297, and a battery 299.

The processor 210 may, for example, drive an operating system or an application program to control a plurality of hardware or software components coupled to the processor 210 and may perform various data processing and operations. The processor 210 may be implemented with, for example, a system on chip (SoC). According to an embodiment, the processor 210 may further include a graphics processing unit (GPU) and/or an image signal processor. The processor 210 may include at least some (e.g., a cellular module 221) of the components shown in FIG. 2. The processor 210 may load and process instructions or data received from at least one of other components (e.g., non-volatile memory) into volatile memory and store the various data in non-volatile memory.

The communication module 220 may include, for example, the cellular module 221, a WiFi module 223, a Bluetooth module 225, a GNSS module 227 (e.g., a GPS module, a Glonass module, a Beidou module, or a Galileo module), an NFC module 228, and a radio frequency (RF) module 229.

The memory 230 may include, for example, an internal memory 232 or an external memory 234. The internal memory 232 may include at least one of a volatile memory (e.g. a dynamic RAM (DRAM), a static random access memory (SRAM), or a synchronous dynamic RAM (SDRAM), a non-volatile memory (e.g., a one time programmable ROM (OTPROM)), a programmable ROM (EPROM), an electrically erasable and programmable ROM (EEPROM), a mask ROM, a flash ROM, a flash memory (e.g., NAND flash or NOR flash), a hard drive, and a solid state drive (SSD).

The external memory 234 may further include a flash drive such as a compact flash (CF), a secure digital (SD), a micro secure digital (SD), a mini secure digital (Mini-SD), extreme digital (xD), a multi-media card (MMC), a memory stick, or the like. The external memory 234 may be functionally and/or physically connected to the electronic device 200 through various interfaces.

The sensor module 240 may, for example, measure a physical quantity or sense an operating state of the electronic device 200 to convert measured or sensed information into an electrical signal. The sensor module 240 may include at least one of a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., an RGB (red, green, blue) sensor), a bio sensor 240I, an temperature/humidity sensor 240J, a first sensor 240K, a second sensor 240L, and an ultra violet (UV) sensor 240M. The sensor module 240 may further include a control circuit for controlling at least one or more sensors belonging to the sensor module 240. In some embodiments, the electronic device 200 may further include a processor configured to control the sensor module 240, either as part of the processor 210 or separately, to control the sensor module 1140 while the processor 210 is in a sleep state.

The input device 250 may include, for example, a touch panel 252, a (digital) pen sensor 254, a key 256, or an ultrasonic input device 258. The touch panel 252 may use at least one of, for example, an electrostatic type, a pressure sensitive type, an infrared type, and an ultrasonic type. Further, the touch panel 252 may further include a control circuit. The touch panel 252 may further include a tactile layer to provide a tactile response to a user.

The (digital) pen sensor 254 may be part of, for example, the touch panel 252 or may include a separate recognition sheet. The key 256 may include, for example, a physical button, an optical key, or a keypad. The ultrasonic input device 258 may detect ultrasonic waves generated from an input tool through a microphone (e.g., 288) to confirm data corresponding to the detected ultrasonic waves.

The display 260 may include a panel 262, a hologram device 264, or a projector 266. The panel 262 may be embodied, for example, flexible, transparent, or wearable. The panel 262 may be configured as a single module with the touch panel 252.

The interface 270 may include, for example, a high-definition multimedia interface (HDMI) 272, a universal serial bus (USB) 274, an optical interface 276, or a D-sub-miniature (D-sub) 278.

The audio module 280 may convert, for example, sound and electrical signals in both directions. The audio module 280 may process sound information input or output through, for example, a speaker 282, a receiver 284, an earphone 286, a microphone 288, or the like.

The camera module 291 may be, for example, a device capable of capturing still images and moving images, and include one or more image sensors (e.g., a front sensor or a rear sensor), a lens, an image signal processor (ISP), or flash (e.g., LED or xenon lamp, etc.) according to an embodiment.

The power management module 297 may manage, for example, the power of the electronic device 200. According to an embodiment, the power management module 297 may include a power management integrated circuit (PMIC), a charger integrated circuit (IC), or a battery or fuel gauge. The PMIC may have a wired and/or wireless charging method. The battery gauge may measure, for example, the remaining amount of the battery 299, the voltage during charging, the current, or the temperature.

The indicator 293 may indicate a specific state of the electronic device 200 or a part thereof (e.g., the processor 210), such as a booting state, a message state, or a charging state. The motor 298 may convert an electrical signal to mechanical vibration and may generate vibration, haptic effects, or the like.

Figure 3:
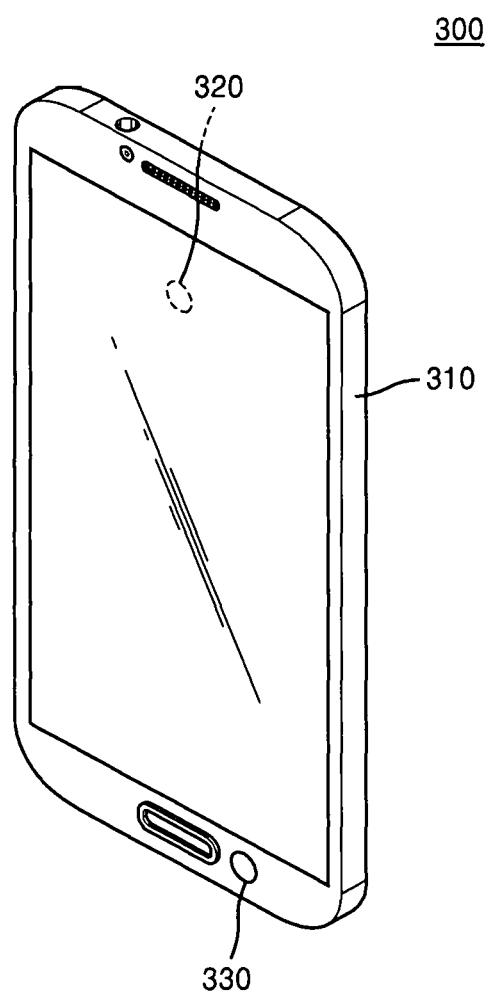
FIG. 3 is a diagram illustrating an example of an electronic device according to an embodiment.

FIG. 3 is a diagram illustrating an example of an electronic device 300 according to an embodiment.

Referring to FIG. 3, the electronic device 300 according to an embodiment may include a plurality of sensors. For example, the electronic device 300 may include a first sensor 320 on a first surface of a housing 310 that includes a display and a second sensor 330 on a second surface of the housing 310. However, this is an embodiment only, and positions of the first sensor 320 and the second sensor 330 in the electronic device 300 may be changed according to the design.

The first sensor 320 according to an embodiment may acquire first sensing information indicating an amount of light around the electronic device 300 in real time or on a designated time basis. For example, the first sensor 320 may acquire the first sensing information indicating the amount of light incident on the first surface of the housing 310 included in the electronic device 300.

According to an embodiment, the electronic device 300 may determine a state of the electronic device 300 based on at least part of the acquired first sensing information and, when it is determined the first sensing information is inappropriate to determine the brightness of the display included in the electronic device 300, activate the second sensor 330

For example, when a variation of the amount of light indicated by the first sensing information is equal to or greater than a specified value, the electronic device 300 may acquire the second sensing information from the second sensor 330 to determine whether an obstacle exists around the first sensor 320. The second sensing information may include information about the amount of light incident on the second surface of the housing 310 included in the electronic device 300. For example, the electronic device 300 may determine whether a change occurs in the first sensing information due to an obstacle around the first sensor 320 by determining whether a light source is present around the electronic device 300, based on at least part of the acquired second sensing information. However, this is only an embodiment and the electronic device 300 may use a proximity sensor (not shown) or a pressure sensor (not shown), which is one of a plurality of sensors, to determine whether the obstacle is preset around the first sensor 320.

According to another embodiment, the electronic device 300 may determine the state of the electronic device 300 using at least one of the plurality of sensors. The at least one sensor may be any one of a gyro sensor and an acceleration sensor, but this is only an embodiment, and the sensor in the disclosed technical idea is not limited to the above-described example.

For example, the electronic device 300 may determine the state of the electronic device 300 based on tilt information of the electronic device 300 acquired from the sensor. Here, the state of the electronic device 300 may be classified into a state in which the electronic device 300 is placed on a table, a state in which the electronic device 300 is held by a user (hereinafter, a holding state), and/or a state in which the electronic device 300 is fixed by a holder. However, this is only an embodiment, and according to another example, the state of the electronic device 300 may be classified based on the tilt of the electronic device 300. According to another example, the state of the electronic device 300 may be classified according to whether the light source or the obstacle is present around the electronic device 300.

The electronic device 300 according to an embodiment may obtain the second sensing information from the second sensor 330 based on the state of the electronic device 300. For example, the electronic device 300 may obtain the second sensing information from the second sensor 330 when the tilt of the electronic device 300 is within a specified range.

The electronic device 300 according to an embodiment may compare the first sensing information and the second sensing information to determine the brightness of the display included in the electronic device 300. For example, the electronic device 300 may determine the brightness of the display included in the electronic device 300 based on at least part of sensing information indicating a greater amount of light between the first sensing information and the second sensing information. According to another example, the electronic device 300 may determine the brightness of the display included in the electronic device 300 based on an average value of the amount of light indicated by each of the first sensing information and the second sensing information.

FIG. 4 is a flowchart illustrating a method performed by an electronic device to control the brightness of a display according to a state of the electronic device determined based on at least part of first sensing information according to various embodiments. The electronic device according to various embodiments may be any of the electronic devices of FIGS. 1-3.

According to various embodiments, in operation 410, the electronic device may perform an operation of obtain the first sensing information from a first sensor located on a first surface of the electronic device.

The electronic device according to an embodiment may include a plurality of sensors. For example, the electronic device may include the first sensor on the first surface of a housing including the display and a second sensor on a second surface of the housing. The first sensor and the second sensor may sense an amount of light incident on the first surface of the housing and an amount of light incident on the second surface, respectively.

According to another embodiment, the electronic device may further include a sensor for acquiring tilt information as well as the first sensor and the second sensor.

According to various embodiments, in operation 420, the electronic device may perform an operation of determining the state of the electronic device based on the at least part of the first sensing information.

The electronic device according to an embodiment may determine the state of the electronic device based on the at least part of the obtained first sensing information. For example, the electronic device may determine whether a variation in an amount of light sensed by the first sensor is equal to or greater than a specified value, based on the at least part of the obtained first sensing information.

According to another embodiment, the electronic device may determine the state of the electronic device based on at least part of the obtained first sensing information and tilt information of the electronic device obtained from a dynamics sensor among a plurality of sensors. For example, the electronic device may determine whether the electronic device is in a holding state, placed on a table, and is fixed to a holder.

According to various embodiments, in operation 430, the electronic device may obtain second sensing information from a second sensor located on a second surface of the electronic device and sensing light, according to a determination result. Here, the second sensing information may include information about the amount of light incident on the second surface of a housing of the electronic device.

The electronic device according to an embodiment may obtain the second sensing information from the second sensor when it is determined that the state of the electronic device is inadequate to determine the brightness of a display by using only the first sensing information. For example, the electronic device may obtain the second sensing information from the second sensor when the variation of the first sensing information is equal to or larger than the specified value. According to another example, the electronic device may obtain the second sensing information from the second sensor when a tilt of the electronic device is included in a specified range.

According to various embodiments, in operation 440, the electronic device may perform an operation of determining the brightness of the display based on at least one of the first sensing information and the second sensing information.

The electronic device according to an embodiment may determine whether a light source is present around the electronic device based on at least part of the second sensing information. When it is determined that the light source is present around the electronic device, the electronic device may determine that an obstacle is present around the first sensor, and a change occurs in the amount of light indicated by the first sensing information. In this case, the electronic device may change the brightness of the display based on the amount of light indicated by the second sensing information, or may maintain the brightness of the display before the obstacle is present around the first sensor.

According to another embodiment, when the tilt of the electronic device is included in the specified range, the electronic device may compare the amount of light respectively indicated by the first sensing information and the second sensing information to determine a position where the light source is present around the electronic device. For example, when the amount of light indicated by the second sensing information is larger than the amount of light indicated by the first sensing information, the electronic device may determine that the light source is present around the second sensor and determine the brightness of the display based on at least part of the second sensing information.

FIG. 5 is a block diagram of an electronic device 500 according to another embodiment.

Only components related to the present embodiment are shown in the electronic device 500 shown in FIG. 5. Therefore, it will be understood by those skilled in the art that general-purpose components other than the components shown in FIG. 5 may be further included.

A first sensor 510 according to an embodiment may obtain first sensing information indicating an amount of light incident on a first surface of the electronic device 500.

A second sensor 520 according to an embodiment may obtain second sensing information indicating an amount of light incident on a second surface of the electronic device 500. The first sensor 510 and the second sensor 520 may be located on different surfaces of the electronic device 500 and may sense at least part of an amount of light incident on the electronic device 500. For example, the first sensor 510 may be located on the first surface of the electronic device 500 and the second sensor 520 may be located on the second surface of the electronic device 500. Accordingly, the first sensor 510 may sense the amount of light incident on the first surface of the electronic device 500, and the second sensor 520 may sense the amount of light incident on the second surface of the electronic device 500.

The processor 530 according to an embodiment may obtain the second sensing information from the second sensor 520 based on at least part of the first sensing information obtained from the first sensor 510. For example, the processor 530 may obtained the second sensing information from the second sensor 520 when a variation of the first sensing information is equal to or greater than a specified value. The processor 530 may minimize power used for driving the second sensor 520 by activating the second sensor 520 and obtaining the second sensing information from the second sensor 520 when the variation of the first sensing information is equal to or greater than the specified value.

The processor 530 according to an embodiment may determine the brightness of a display 540 based on at least one of the first sensing information and the second sensing information.

For example, when the variation of the first sensing information is equal to or greater than the specified value and the amount of light of the second sensing information is equal to or greater than the designated value, the processor 530 may determine that the amount of light is not properly detected due to an obstacle present around the first sensor 510. Accordingly, the processor 530 may determine the brightness of the display 540 according to the amount of light indicated by the second sensing information, or may maintain the brightness of the display 540 previously determined based on at least part of the first sensing information.

According to another example, when the processor 530 determines that a light source is not present around the electronic device 500 as a result of determining based on at least part of the second sensing information, the processor 530 may change the brightness of the display 540 based on at least part of the changed first sensing information.

FIG. 6 is a flowchart illustrating a method performed by an electronic device to determine the brightness of a display using sensing information obtained from at least one of a first sensor and a second sensor according to a state of the electronic device according to various embodiments. The electronic device according to various embodiments may be any of the electronic devices of FIGS. 1-3.

According to various embodiments, in operation 610, the electronic device may obtain first sensing information from a first sensor located on a first surface of the electronic device.

The electronic device according to an embodiment may acquire the first sensing information from the first sensor located on the first surface of a housing including the display in real time or at a specified time interval among a plurality of sensors included in the electronic device. The first sensing information according to an embodiment may include information about an amount of light incident on the first surface of the housing including the display.

In operation 620 according to various embodiments, the electronic device may obtain tilt information of the electronic device.

An electronic device according to an embodiment may obtain tilt information of the electronic device using a mechanical sensor among the plurality of sensors included in the electronic device. The tilt information may be determined based on at least one of the speed, acceleration, number of revolutions, vibration, torque and pressure of the electronic device sensed by a dynamics sensor.

In operation 630 according to various embodiments, the electronic device may determine whether the tilt of the electronic device is within a specified range.

The electronic device according to an embodiment may specify information about a range of the tilt of the electronic device where the first sensor is less likely to sense a light source present around the electronic device. For example, the electronic device may previously set the tilt range in which the first sensor is less likely to sense the light source present around the electronic device as −30 to 30 degrees on a horizontal or vertical basis.

The electronic device according to an embodiment may obtain the tilt information from the dynamics sensor since the first sensing information is obtained from the first sensor and determine whether the tilt of the electronic device is included in the specified range based on at least part of the obtained tilt information.

When the tilt of the electronic device is included in the specified range as a result of the determining operation 630, the second sensing information may be obtained from the second sensor in operation 640 according to various embodiments.

The electronic device according to an embodiment may obtain the second sensing information from the second sensor located on a second surface of the housing, among the plurality of sensors included in the electronic device. The second sensing information according to an embodiment may include information about the amount of light incident on the second surface of the housing including the display.

In operation 650 according to various embodiments, the electronic device may determine the brightness of the display based on at least one of the first sensing information and the second sensing information.

The electronic device according to an embodiment may determine the brightness of the display based on at least part of sensing information indicating a greater amount of the first sensing information and the second sensing information. For example, when the amount of light indicated by the second sensing information is larger than the amount of light indicated by the first sensing information since the light source is present on the second surface of the electronic device, the electronic device may determine the brightness of the display based on at least part of the second sensing information.

According to another embodiment, the electronic device may determine the brightness of the display based on an average value of the amount of light indicated by each of the first sensing information and the second sensing information. However, this is an embodiment only, and the method performed by the electronic device of determining the brightness of the display based on at least part of the first sensing information and the second sensing information is not limited thereto. According to another example, the electronic device may determine the brightness of the display by applying different weights to the first sensing information and the second sensing information, respectively.

When the tilt of the electronic device is not in the specified range as a result of the determining operation 630, in operation 660 according to various embodiments, the electronic device may determine the brightness of the display based on at least part the first sensing information.

The electronic device according to an embodiment may determine that the accuracy of the first sensing information obtained from the first sensor of the electronic device is high when the tilt of the electronic device is not included in the specified range. Thus, the electronic device may determine the brightness of the display based on at least part of the first sensing information, without activating the second sensor. The electronic device may selectively activate the second sensor according to a state of the electronic device and acquire the second sensing information from the second sensor, thereby more efficiently using the power consumed to drive the second sensor.

Figure 7A:
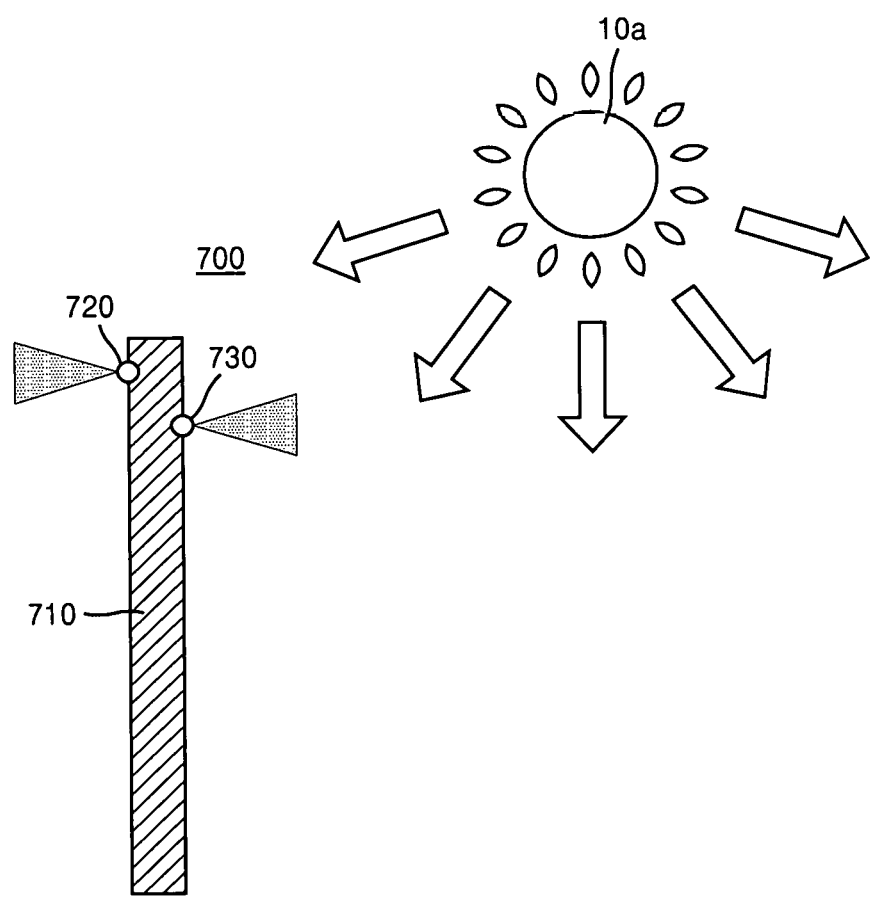
FIGS. 7A and 7B are diagrams for explaining a method performed by an electronic device to determine the brightness of a display using sensing information obtained from at least one of a first sensor and a second sensor according to a state of the electronic device according to various embodiments.
Figure 7B:
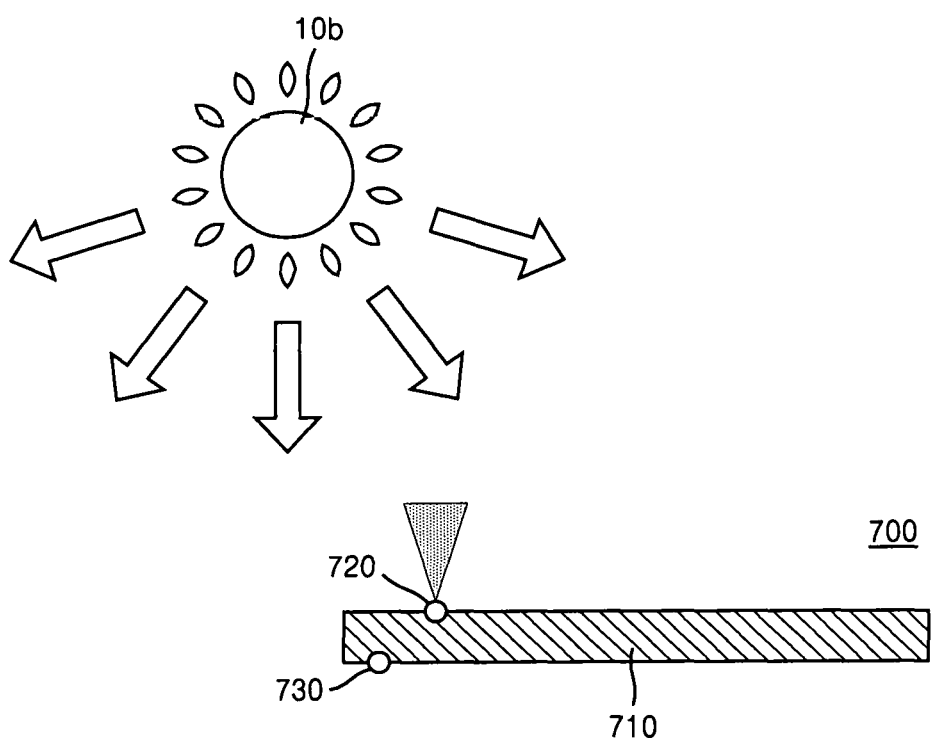

FIGS. 7A and 7B are diagrams for explaining a method performed by an electronic device 700 to determine the brightness of a display using sensing information obtained from at least one of a first sensor 720 and a second sensor 730 according to a state of the electronic device 700 according to various embodiments. The electronic device 700 according to various embodiments may be any of the electronic devices of FIGS. 1-3.

According to an embodiment, the electronic device 700 may include a plurality of sensors. For example, the electronic device 700 may include the first sensor 720 located on a first surface of a housing 710 included in the electronic device 700 and the second sensor 730 located on a second surface of the housing 710. According to another example, a plurality of sensors of the electronic device 700 may include a dynamics sensor (not shown) that obtains tilt information of the electronic device 700.

The electronic device 700 according to an embodiment may determine the state of the electronic device 700 based on at least part of sensing information obtained from at least some of the plurality of sensors. For example, the electronic device 700 may determine the state of the electronic device 700 based on at least part of the tilt information of the electronic device 700 obtained from the dynamics sensor.

The electronic device 700 according to an embodiment may obtain second sensing information from the second sensor 730 when the tilt of the electronic device 700 is included in a specified range as a result of determining the state of the electronic device 700. For example, the electronic device 700 may obtain the second sensing information from the second sensor 730 when the tilt of the electronic device 700 is included in a range of −30 degrees to 30 degrees.

In FIG. 7A, the electronic device 700 may acquire the second sensing information from the second sensor 730 when the tilt of the electronic device 700 is included in the range of −30 degrees to 30 degrees on a vertical basis. Meanwhile, in FIG. 7B, the electronic device 700 may acquire the second sensing information from the second sensor 730 when the tilt of the electronic device 700 is included in the range of −30 degrees to 30 degrees on a horizontal basis. The electronic device 700 may select the second sensing information indicating a greater amount of light between the obtained first sensing information and second sensing information. The electronic device 700 may determine the brightness of the display based on at least part of the selected second sensing information. Accordingly, the electronic device 700 may use the second sensing information obtained from the second sensor 730 when the first sensor 720 does not sense an appropriate amount of light since a light source is present in a direction of the second surface of the electronic device 700, thereby providing a user of the electronic device 700 with the display of more appropriate brightness than a surrounding environment of the electronic device 700.

Figure 8:
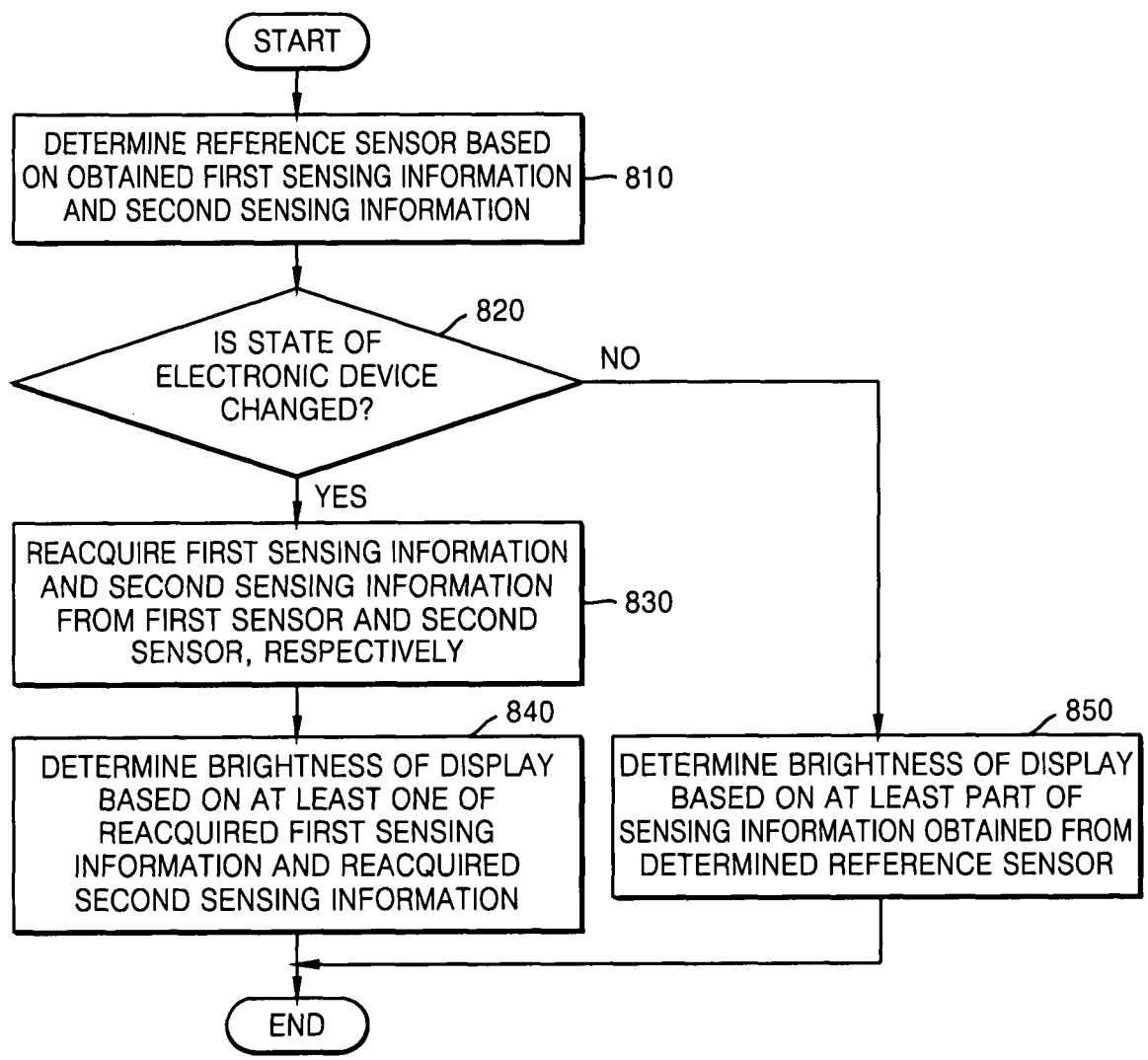
FIG. 8 is a flowchart illustrating a method performed by an electronic device to determine whether a state of the electronic device is changed and selecting a reference sensor between a first sensor and a second sensor according to various embodiments.

FIG. 8 is a flowchart illustrating a method performed by an electronic device to determine whether a state of the electronic device is changed and selecting a reference sensor between a first sensor and a second sensor according to various embodiments. The electronic device according to various embodiments may be any of the electronic devices of FIGS. 1-3.

According to various embodiments, in operation 810, the electronic device may perform an operation of determining the reference sensor based on at least part of obtained first sensing information and second sensing information.

When obtaining the second sensing information based on the state of the electronic device, the electronic device according to an embodiment may select any one of the previously obtained first sensing information and the second sensing information by comparing the first sensing information and the second sensing information. For example, the electronic device may select the sensing information indicating a greater amount of light between the first sensing information and the second sensing information. Here, a sensor that senses the selected sensing information may be determined as the reference sensor.

According to various embodiments, in operation 820, the electronic device may determine whether the state of the electronic device is changed after the determining reference sensor.

The electronic device according to an embodiment may determine whether the state of the electronic device is changed based on at least part of tilt information of the electronic device obtained after determining the reference sensor. For example, the electronic device may determine, based on the at least part of the obtained tilt information of the electronic device, whether the tilt of the electronic device is included in a specified range.

The electronic device according to another embodiment may determine whether an obstacle is present around the electronic device after determining the reference sensor. For example, the electronic device may determine whether a user's finger is present around the first sensor or the second sensor based on at least part of sensing information obtained from a pressure sensor among the plurality of sensors.

As a result of the determining operation 820, when the state of the electronic device is changed, according to various embodiments, in operation 830, the electronic device may reacquire the first sensing information and the second sensing information from the first sensor and the second sensor, respectively.

The electronic device according to an embodiment may reacquire first sensing information and second sensing information from the first sensor and the second sensor, respectively, when determining in the determining operation 820 that the state of the electronic device is changed.

According to various embodiments, in operation 840, the electronic device may determine the brightness of the display based on at least one of the reacquired first sensing information and the reacquired second sensing information.

The electronic device according to an embodiment may compare the reacquired first sensing information and second sensing information to select the sensing information indicating a larger amount of light. Thus, the electronic device may determine the brightness of the display based on at least part of the selected sensing information.

According to another embodiment, the electronic device may determine the brightness of the display based on an average value of the amount of light indicated by each of the reacquired first sensing information and second sensing information.

As a result of the determining operation 820, when the state of the electronic device is not changed, in operation 850 according to various embodiments, the electronic device may determine the brightness of the display based on at least part of sensing information obtained from the determined reference sensor.

The electronic device according to an embodiment may determine the brightness of the display based on at least part of the sensing information obtained from the previously determined reference sensor since it is determined in operation 820 that the state of the electronic device is not changed.

Figure 9:
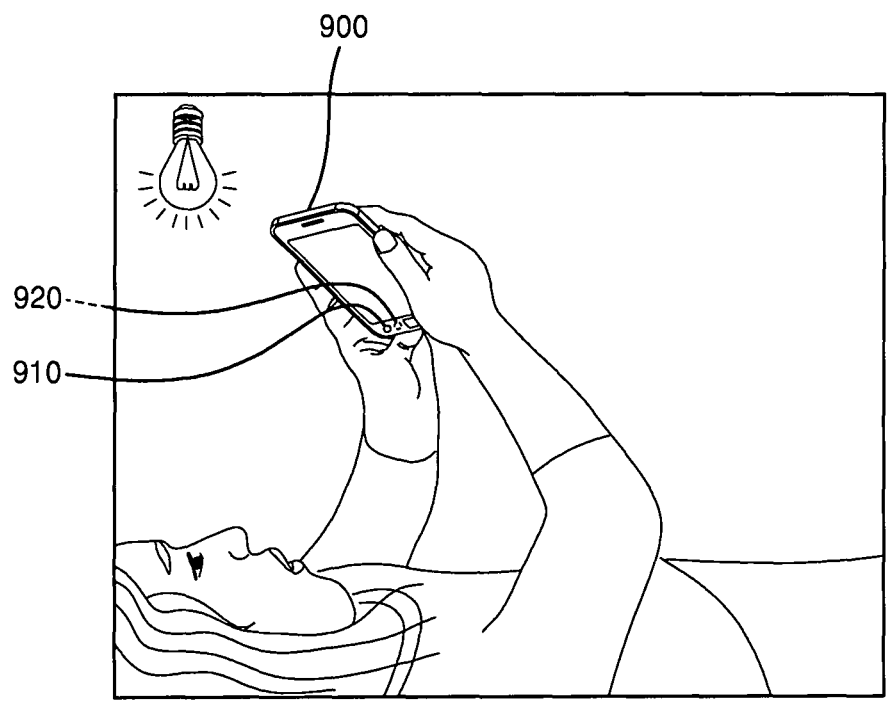
FIG. 9 is a diagram for explaining a method performed by an electronic device to control the brightness of a display when the tilt of the electronic device is changed according to various embodiments.

FIG. 9 is a diagram for explaining a method performed by an electronic device 900 to control the brightness of a display when the tilt of the electronic device 900 is changed according to various embodiments. The electronic device 900 according to various embodiments may be any of the electronic devices of FIGS. 1-3.

The electronic device 900 according to an embodiment may determine the brightness of the display based on at least part of sensing information obtained from a reference sensor determined at a first time. When the state of the electronic device 900 is changed after the electronic device 900 determines the reference sensor, the brightness of the display may not be suitably provided according to the changed state of the electronic device 900.

Accordingly, the electronic device 900 according to an embodiment may re-determine the reference sensor when it is determined that the determined reference sensor is inappropriate as a result of determining the state of the electronic device 900 after determining the reference sensor.

For example, referring to FIG. 9, when a user holds the electronic device 900, the tilt of the electronic device 900 may be changed according to the height of a user's arm. Accordingly, an amount of light sensed by each of a first sensor and a second sensor included in the electronic device 900 may be changed.

When the electronic device 900 according to an embodiment determines that the reference sensor does not correspond to the tilt of the electronic device 900 as a result of determining the state of the electronic device 900, the electronic device 900 may reacquire first sensing information and second sensing information from a first sensor 910 and a second sensor 920, respectively. For example, when the first sensor 910 is determined as the reference sensor, since the tilt of the electronic device 900 is included in a specified range, the electronic device 900 may reacquire the first sensing information and the second sensing information from the first sensor 910 and the second sensor 920, respectively.

In FIG. 9, since the user tilts the electronic device 900, the first sensor 910, which is the reference sensor, may not sense light incident from a light source located in a direction of a second surface of the electronic device 900. Accordingly, the electronic device 900 may compare the re-acquired first sensing information and second sensing information to determine the brightness of the display based on at least part of the second sensing information having a greater value, thereby providing the user with the display of a more appropriate brightness.

Figure 10:
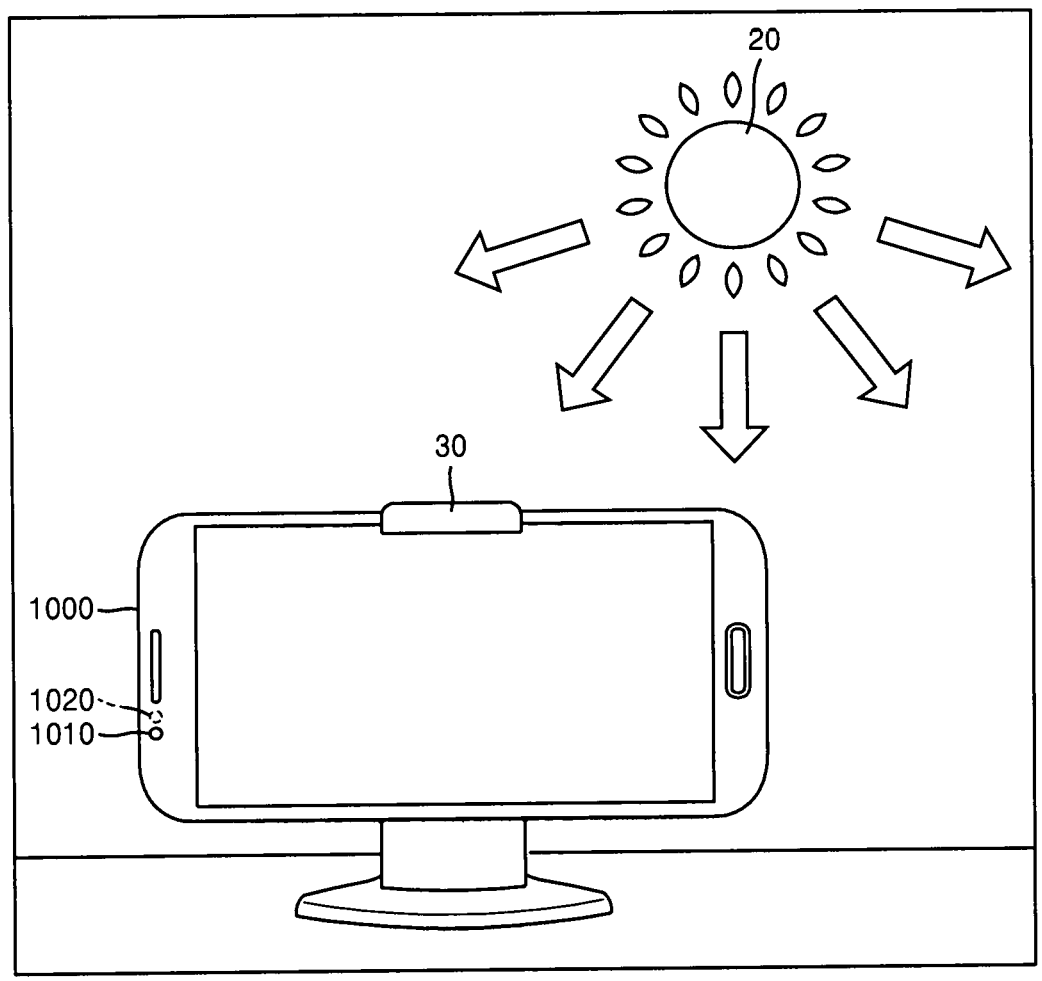
FIG. 10 is a diagram for explaining a method performed by an electronic device to determine the brightness of a display when the electronic device is coupled to a holder according to various embodiments.

FIG. 10 is a diagram for explaining a method performed by an electronic device 1000 to determine the brightness of a display when the electronic device 1000 is coupled to a holder 30 according to various embodiments. The electronic device according to various embodiments may be any of the electronic devices of FIGS. 1-3.

The electronic device 1000 according to an embodiment may use at least part of sensing information obtained from a plurality of sensors included in the electronic device 1000 to determine whether the electronic device 1000 is coupled to the holder 30. For example, the electronic device 1000 may determine that the electronic device 1000 is coupled to the holder 30 when tilt information obtained from a dynamics sensor among the plurality of sensors is maintained for a specified time or more.

According to another embodiment, the electronic device 1000 may determine whether the electronic device 1000 is coupled to the holder 30 by determining whether a connector (not shown) included in the electronic device 1000 is connected to the holder 30.

When the electronic device 1000 according to an embodiment determines that the electronic device 1000 is coupled to the holder 30, the electronic device 1000 according to an embodiment may obtain second sensing information indicating an amount of light incident in a direction of a second surface from a second sensor 1020 located on the second surface of the electronic device 1000. Meanwhile, it is assumed that the electronic device 1000 acquires first sensing information about an amount of light incident on a first surface in real time or on a designated time basis from a first sensor 1010 located on a first surface of the electronic device 1000.

The electronic device 1000 according to an embodiment may determine the brightness of the display based on at least part of the sensing information indicating a greater amount of light by comparing the obtained second sensing information with the previously obtained first sensing information when it is determined that the electronic device 1000 and the holder 30 are coupled to each other. According to another embodiment, the electronic device 1000 may determine the brightness of the display based on at least part of the second sensing information by determining that the accuracy of the second sensing information is higher when the electronic device 1000 and the holder 30 are coupled to each other.

Figure 11:
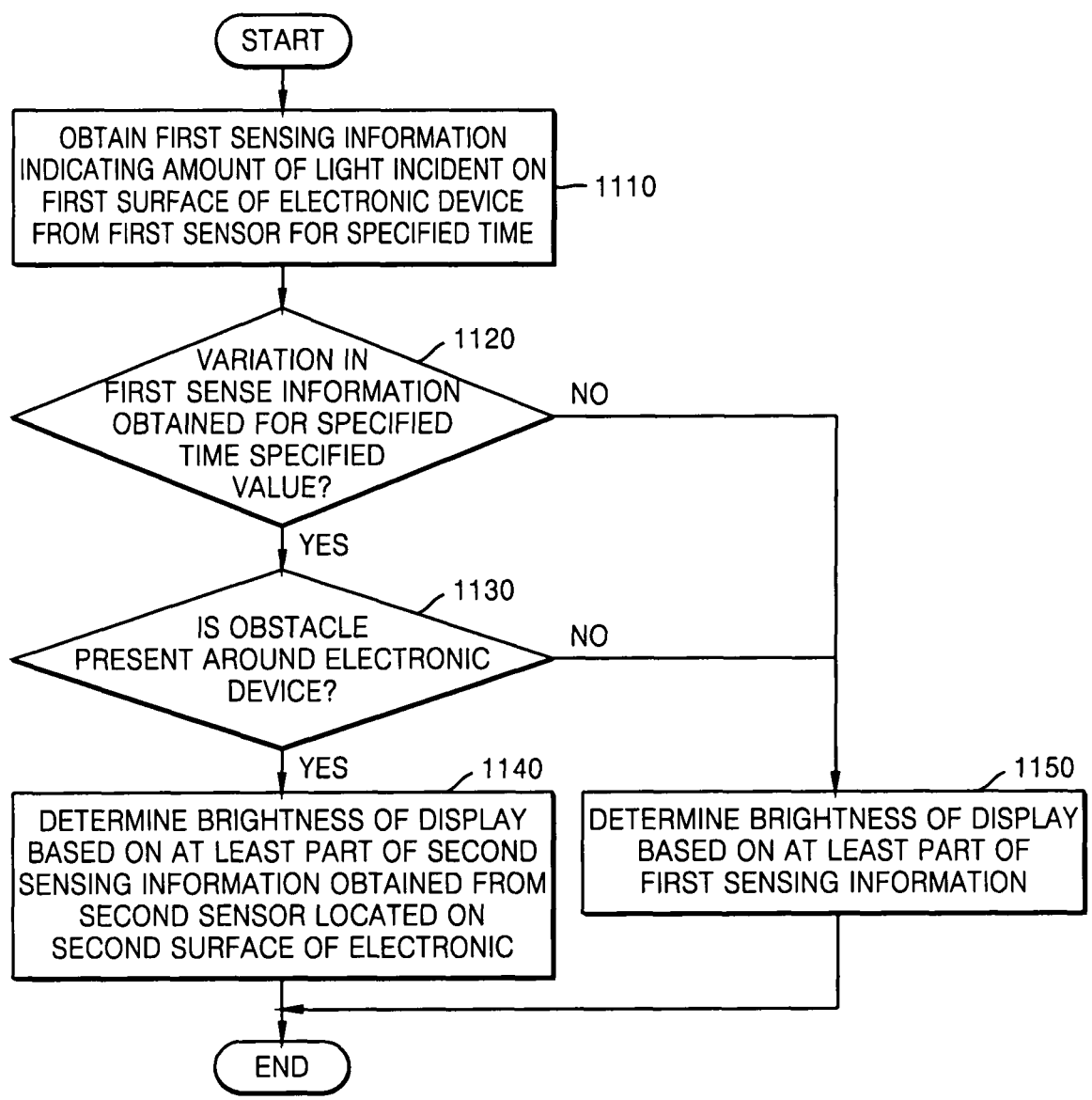
FIG. 11 is a flowchart illustrating a method performed by an electronic device to determine the brightness of a display based on whether an obstacle is present around the electronic device according to various embodiments.

FIG. 11 is a flowchart illustrating a method performed by an electronic device to determine the brightness of a display based on whether an obstacle is present around the electronic device according to various embodiments. The electronic device according to various embodiments may be any of the electronic devices of FIGS. 1-3.

In operation 1110 according to various embodiments, the electronic device may obtain first sensing information indicating an amount of light incident on a first surface of the electronic device from a first sensor for a specified time.

In operation 1120 according to various embodiments, the electronic device may determine whether a variation in the first sense information obtained for the specified time is greater than or equal to a specified value. For example, the electronic device may determine whether an amount of reduction in the amount of light indicated by the first sensing information obtained for the specified time is greater than or equal to the specified value.

When the variation in the first sensing information obtained for the specified time is greater than or equal to the specified value as a result of determining operation 1120, in operation 1130 according to various embodiments, the electronic device may determine whether the obstacle is present around the electronic device based on at least part of sensing information obtained from a plurality of sensors included in the electronic device.

When it is determined that the variation in the first sensing information obtained for the specified time is greater than or equal to the specified value in operation 1120, the electronic device according to an embodiment may obtain the sensing information for determining whether the obstacle is present around the electronic device from the plurality of sensors included in the electronic device. For example, the electronic device may determine whether a user's finger or an object is present around a first sensor based on at least part of sensing information obtained from a pressure sensor or a proximity sensor among the plurality of sensors.

When it is determined that the variation in the first sensing information obtained for the specified time is greater than or equal to the specified value in operation 1120, the electronic device according to another embodiment may obtain second sensing information indicating an amount of light incident on a second surface of the electronic device from a second sensor among the plurality of sensors included in the electronic device. When the amount of light incident on the second surface of the electronic device is greater than or equal to a specified value as a result of determination based on at least part of the second sensing information, the electronic device may determine that the first sensing information is changed due to the obstacle present around the first sensor.

When the obstacle is present around the electronic device as a result of determining operation 1130, in operation 1140 according to various embodiments, the electronic device may determine the brightness of the display based on at least part of the second sensing information.

When the obstacle is present around the electronic device as a result of determining operation 1130, the electronic device according to an embodiment may determine the brightness of the display based on at least part of the second sensing information obtained from the second sensor located on the second surface of the electronic device. Accordingly, even when the first sensing information sensed by the first sensor is incorrect due to the obstacle, the electronic device may provide the user with the display of appropriate brightness based on at least part of the second sensing information obtained from the second sensor located on the second surface that is a different surface from the first sensor.

When it is determined that the variation in the first sensing information obtained for the specified time is greater than or equal to the specified value as a result of determining operation 1120, or when the obstacle is present around the electronic device as a result of determining operation 1130, in operation 1150 according to various embodiments, the electronic device may determine the brightness of the display based on at least part of the first sensing information.

When it is determined that the variation in the first sensing information obtained for the specified time is less than the specified value as a result of determining operation 1120, or when the obstacle is not present around the electronic device as a result of determining operation 1130, the electronic device according to an embodiment may determine the brightness of the display based on at least part of the first sensing information.

Figure 12:
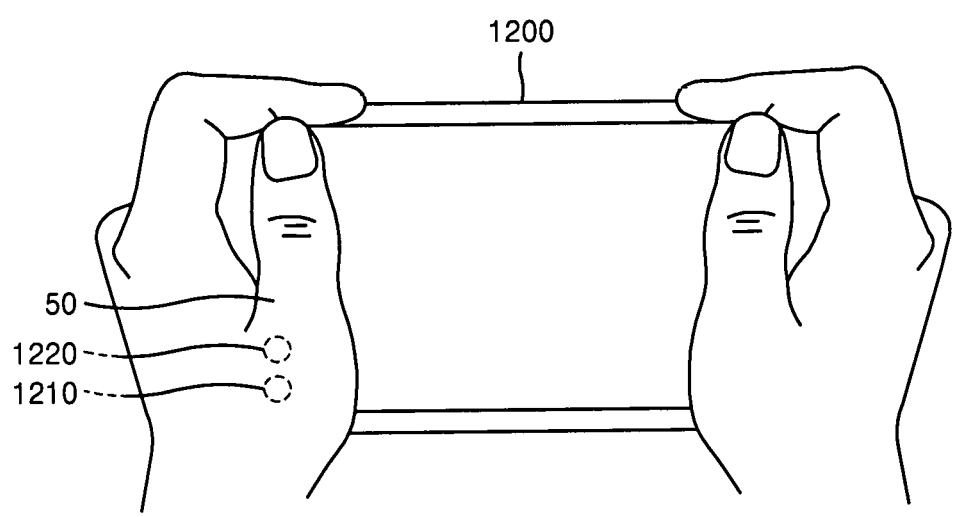
FIG. 12 is a diagram illustrating a method performed by an electronic device to determine the brightness of a display based on whether an obstacle is present around the electronic device according to various embodiments.

FIG. 12 is a diagram illustrating a method performed by an electronic device 1200 to determine the brightness of a display based on whether an obstacle is present around the electronic device 1200 according to various embodiments. The electronic device according to various embodiments may be any of the electronic devices of FIGS. 1-3.

The electronic device 1200 according to an embodiment may obtain first sensing information from a first sensor 1210 located on a first surface of a housing included in the electronic device 1200 in real time or on a specified time unit basis. Also, according to another example, the electronic device 800 may determine whether a variation in the first sensing information obtained for the specified time is greater than or equal to a specified value.

Referring to FIG. 12, it may be confirmed that a user's finger 50, which is an obstacle, is present around the first sensor 1210 located on the first surface of the housing included in the electronic device 1200. Accordingly, in the embodiment of FIG. 12, it is assumed that the variation of the first sensing information obtained for the designated time in the electronic device 1200 is equal to or higher than the specified value.

When the variation of the first sensing information is equal to or higher than the specified value, the electronic device 1200 according to an embodiment may obtain second sensing information related to an amount of light incident in a direction of the second surface of the electronic device 1200 from the second sensor 1220 to determine whether the obstacle is present around the electronic device 1200. However, this is an embodiment only, and information obtained for the electronic device 1200 to determine whether the obstacle is present around the electronic device 1200 is not limited to the second sensing information.

When the an amount of light indicated by the second sensing information is equal to or higher than a specified value, the electronic device 1200 according to an exemplary embodiment may determine that a light source is present. Accordingly, the electronic device 1200 may determine that the obstacle is present around the first sensor 1210 and causes a change in the first sensing information obtained by the first sensor 1210.

The electronic device 1200 according to an embodiment may determine the brightness of the display based on at least part of the second sensing information obtained from the second sensor 1220 since the obstacle is present around the first sensor 1210.

Figure 13:
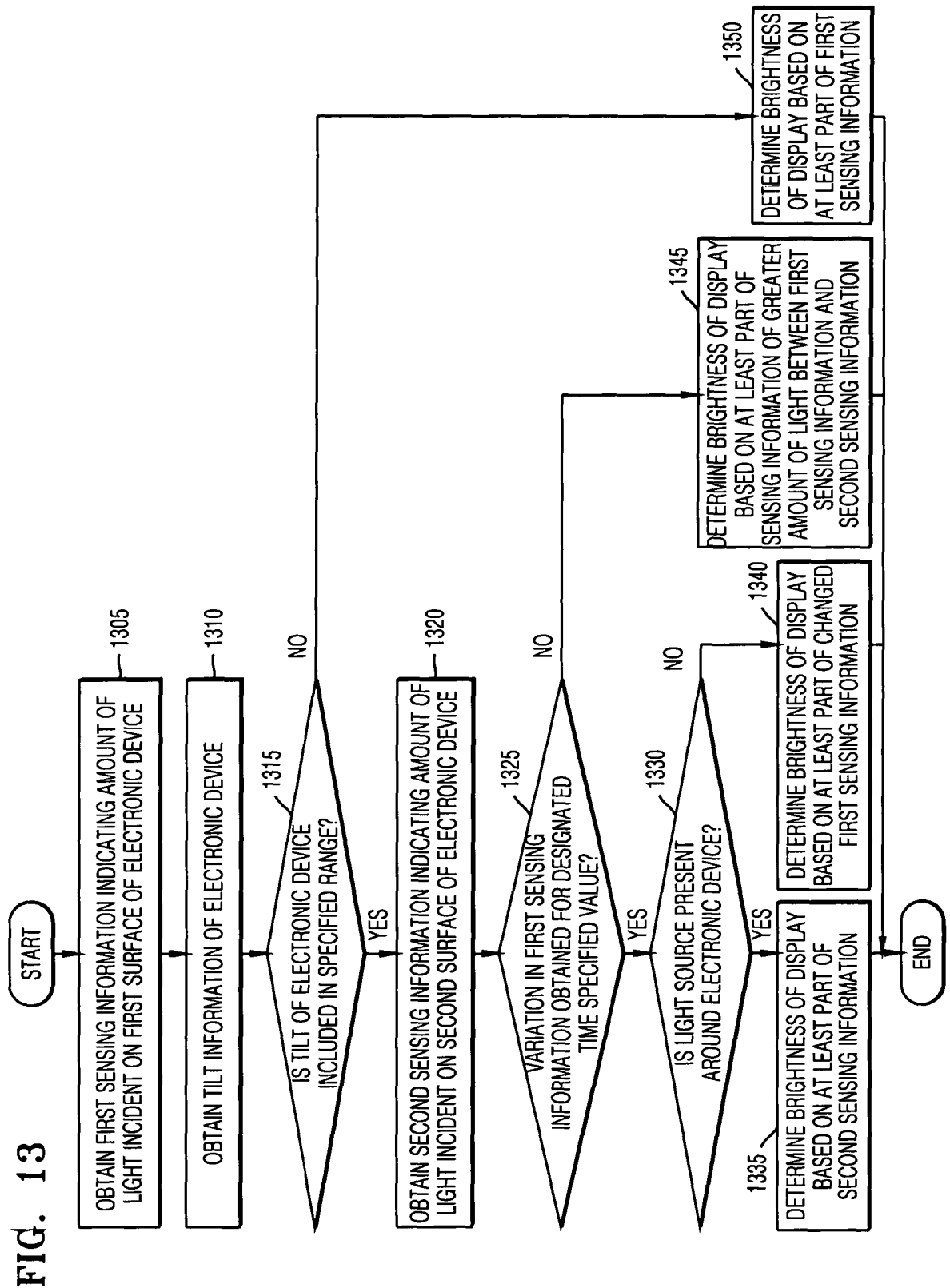
FIG. 13 is a flowchart illustrating a method performed by an electronic device to determine the brightness of a display according to a state of the electronic device determined based on at least part of sensing information according to various embodiments.

FIG. 13 is a flowchart illustrating a method performed by an electronic device to determine the brightness of a display according to a state of the electronic device determined based on at least part of sensing information according to various embodiments. The electronic device according to various embodiments may be any of the electronic devices of FIGS. 1-3.

In operation 1305 according to various embodiments, the electronic device may obtain first sensing information indicating an amount of light incident on a first surface of the electronic device.

The electronic device according to an embodiment may include a plurality of sensors. For example, the electronic device may include a first sensor on the first surface of a housing that includes the display. Here, the first sensor may sense an amount of light incident on the first surface of the housing of the electronic device.

In operation 1310 according to various embodiments, the electronic device may obtain tilt information of the electronic device.

The electronic device according to an embodiment may obtain the tilt information of the electronic device from a dynamics sensor among the plurality of sensors. For example, the electronic device may obtain the tilt information of the electronic device from an acceleration sensor, which is the dynamics sensor, since the first sensing information is obtained from the first sensor.

In operation 1315 according to various embodiments, the electronic device may determine whether the tilt of the electronic device is included in a specified range based on at least part of the obtained tilt information. For example, the electronic device may determine whether the tilt of the electronic device is included in a range of −30 degrees to 30 degrees based on a horizontal direction or a vertical direction based on the at least part of the obtained tilt information.

When the tilt of the electronic device is included in the specified range as a result of the determining operation 1315, in operation 1320 according to various embodiments, the electronic device may obtain second sensing Information indicating an amount of light incident on a second surface of the electronic device from a second sensor of the electronic device.

The electronic device according to an embodiment may activate the second sensor located on the second surface of the housing of the electronic device since it is determined in the determining operation 1315 that the tilt of the electronic device is included in the specified range. Thus, the electronic device may obtain the second sensing information indicating the amount of light incident on the second surface of the electronic device from the second sensor.

In operation 1325 according to various embodiments, the electronic device may determine whether a variation in the first sensing information obtained for a designated time is greater than or equal to a specified value.

The electronic device according to an embodiment may store the previously obtained first sensing information. The electronic device may determine whether the variation of the first sensing information obtained for the designated time is equal to or greater than the specified value based on at least part of the stored first sensing information.

When the variation in the first sensing information obtained for the designated time is greater than or equal to the specified value as a result of the determining operation 1325, in operation 1330 according to various embodiments, the electronic device may determine whether a light source is present around the electronic device based on at least part of the sensing information obtained from the plurality of sensors.

The electronic device according to an embodiment may determine whether the light source is present around the electronic device based on at least part of the sensing information obtained from the plurality of sensors since it is determined that the variation in the first sensing information obtained for the designated time is greater than or equal to the specified value in the determining operation 1325. For example, the electronic device may determine whether the light source is present around the electronic device by determining whether the light amount indicated by the second sensing information obtained from the second sensor is equal to or greater than the specified value. According to another example, the electronic device determine whether the light source is present around the electronic device by determining whether an obstacle is present around the first sensor based on at least part of sensing information obtained from a pressure sensor or a proximity sensor among the plurality of sensors. Here, when the obstacle is present around the first sensor, it may be assumed that the first sensor does not sense the obstacle even though the light source is present.

As a result of the determining operation 1330, when the obstacle is present around the electronic device, in operation 1335 according to various embodiments, the electronic device may determine the brightness of the display based on at least part of the second sensing information.

The electronic device according to an embodiment may determine the brightness of the display based on at least part of the second sensing information since it is determined in the determining operation 1330 that the light source is present around the electronic device.

As a result of the determining operation 1330, when no obstacle is present around the electronic device, in operation 1340 according to various embodiments, the electronic device may determine the brightness of the display based on at least part of the changed first sensing information.

The electronic device according to an embodiment may determine the brightness of the display based on at least part of the changed first sensing information since it is determined in the determining operation 1330 that no light source is present around the electronic device.

When the variation in the first sensing information obtained for the designated time is equal to or greater than the specified value as a result of the determining operation 1325, in operation 1345 according to various embodiments, the electronic device may determine the brightness of the display based on at least part of the sensing information of a greater amount of light between the first sensing information and the second sensing information.

The electronic device according to an embodiment may determine the brightness of the display based on at least part of the sensing information of the greater amount of light between the first sensing information and the second sensing information since it is determined that the variation in the first sensing information obtained for the designated time is less than the specified value as a result of the determining operation 1325.

As a result of the determining operation 1315, when the tilt of the electronic device is included in the specified range, in operation 1350 according to various embodiments, the electronic device may determine the brightness of the display based on at least part of the first sensing information.

The electronic device according to an embodiment may determine the brightness of the display based on at least part of the first sensing information since it is determined in the determining operation 1315 that the tilt of the electronic device is not included in the specified range.

Each of elements described in the present disclosure may include one or more components, and the name of the element may be changed according to a type of an electronic device. In various embodiments, the electronic device may be configured to include at least one of the elements described herein and include some elements omitted or further include additional elements. Also, some of the elements of the electronic device according to various embodiments may be combined to form one entity and performs functions of the elements before combined in the same manner.

The present disclosure may be implemented by storing computer-readable codes in a non-transitory computer-readable storage medium. The non-transitory computer-readable storage medium is any data storage device that stores data which may be thereafter read by a computer system.

The computer-readable codes are configured to execute operations of implementing the methods for performing a split-screen display according to the present disclosure when the computer-readable codes are read, from the non-transitory computer-readable storage medium, and executed by a processor. The computer-readable codes may be implemented by various programming languages. And the functional programs, codes and code segments for embodying the inventive concept may be easily construed by programmers in the art which the inventive concept belongs to.

Examples of the non-transitory computer-readable storage medium include ROM, RAM, CD-ROMs, magnetic tape, floppy disk, optical data storage devices. The non-transitory computer-readable storage medium may also be distributed over a network coupled computer system so that the computer-readable codes are stored and executed in distributed fashion.

While this disclosure has been particularly shown and described with reference to the embodiments thereof, it will be understood by one of ordinary skill in the art that various changes in form and details may be made therein without departing from the spirit and scope of the disclosure as defined by the appended claims. The embodiments should be considered in a descriptive sense only and not for purposes of limitation.

The invention claimed is:

1. An electronic device comprising:
a display;
a first sensor located on a first surface of a housing comprising the display configured to obtain first sensing information;
a second sensor located on a second surface of the housing; and
a processor configured to identify validity of light information included in the first sensing information on the basis of at least part of first sensing information acquired by the first sensor, acquire second sensing information from the second sensor on the basis of a result of determination, and determine brightness of the display on the basis of at least one of the first sensing information and the second sensing information,
wherein the second sensor comprises a sensor configured to sense light.

2. The electronic device of claim 1,
wherein the first sensor is located on the first surface of the housing in which the display is disposed,
wherein the second sensor is located on the second surface of the housing in which the display is not disposed.

3. The electronic device of claim 1, further comprising:
a sensor configured to obtain tilt information of the electronic device,
wherein the processor is configured to determine the state of the electronic device based on at least part of the tilt information of the electronic device.

4. The electronic device of claim 1, further comprising:
a connector connected to a holder supporting the electronic device,
wherein the processor is configured to determine the state of the electronic device based on at least part whether the connector and the holder are connected to each other.

5. The electronic device of claim 1, wherein the processor is configured to acquire the second sensing information from the second sensor and determine whether a light source is present when a variation of the first sensing information is equal to or greater than a specified value.

6. The electronic, device of claim 5, wherein the processor is configured to change the brightness of the display based at least part of the first sensing information when the light source is not present and maintain the brightness of the display when the light source is present.

7. The electronic device of claim 1, wherein the processor is configured to select sensing information indicating a larger amount of light between the first sensing information and the second sensing information and determine the brightness of the display based on at least part of the selected sensing information.

8. The electronic device of claim 7, wherein the controller is configured to re-acquire sensing information from the first sensor and the second sensor, respectively, and determine the brightness of the display based on the re-acquired sensing information when the tilt of the electronic device is out of a threshold range after selecting the sensing information.

9. A method performed by an electronic device to control brightness of a display, the method comprising:
obtaining first sensing information including light information from a first sensor located on a first surface of the electronic device;
identifying validity of the light information based on at least part of the first sensing information;
obtaining second sensing information from a second sensor located on a second surface of the electronic device and sensing light according to a result of the determining of the state of the electronic device; and
determining brightness of a display based on at least one of the first sensing information and the second sensing information.

10. The method of claim 9, further comprising:
obtaining tilt information of the electronic device,
wherein the determining of the state of the electronic device comprises determining the state of the electronic device based on at least part of the tilt information of the electronic device.

11. The method of claim 9, wherein the determining of the state of the electronic device comprises determining the state of the electronic device based on whether a holder supporting the electronic device and a connector included in the electronic device are connected to each other.

12. The method of claim 9, further comprising
acquiring the second sensing information from the second sensor and determining whether a light source is present when a variation of the first sensing information is equal to or greater than a specified value.

13. The method of claim 12, wherein the determining of the brightness of the display comprises changing the brightness of the display based at least part of the first sensing information when the light source is not present and maintaining the brightness of the display when the light source is present.

14. The method of claim 9, wherein the determining of the brightness of the display comprises selecting sensing information indicating a larger amount of light between the first sensing information and the second sensing information and determining the brightness of the display based on at least part of the selected sensing information.

15. The method of claim 14, further comprising:
re-acquire sensing information from the first sensor and the second sensor, respectively, and determining the brightness of the display based on the re-acquired sensing information when the tilt of the electronic device is out of a threshold range after selecting the sensing information.

* * * * *